(12) United States Patent
Li

(10) Patent No.: US 7,733,571 B1
(45) Date of Patent: Jun. 8, 2010

(54) PHOSPHOR SCREEN AND DISPLAYS SYSTEMS

(75) Inventor: Shu Li, Fremont, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 362 days.

(21) Appl. No.: 11/880,850

(22) Filed: Jul. 24, 2007

(51) Int. Cl.
*G02B 27/14* (2006.01)

(52) U.S. Cl. ..................... 359/630; 359/262

(58) Field of Classification Search ........... 359/630, 359/262
See application file for complete search history.

(56) References Cited

U.S. PATENT DOCUMENTS

| | | | | |
|---|---|---|---|---|
| 5,089,749 | A | * | 2/1992 | Cadogan ............ 315/151 |
| 5,801,792 | A | | 9/1998 | Smith |
| 6,285,345 | B1 | | 9/2001 | Crossland |
| 6,947,198 | B2 | | 9/2005 | Morikawa |
| 7,005,197 | B2 | | 2/2006 | Shiiki |
| 7,210,792 | B2 | | 5/2007 | Peterson |
| 7,210,977 | B2 | | 5/2007 | Ouderkirk |
| 2001/0019240 | A1 | * | 9/2001 | Takahashi ............ 313/483 |
| 2006/0057753 | A1 | * | 3/2006 | Schardt et al. ............ 438/34 |

* cited by examiner

*Primary Examiner*—Jordan M. Schwartz
*Assistant Examiner*—James C Jones
(74) *Attorney, Agent, or Firm*—Matthew J. Evans; Daniel M. Barbieri

(57) ABSTRACT

A phosphor screen for image forming including phosphor material being excitable by light in a wavelength λ1. The phosphor screen receives an optical image from an image forming optical system and produces the optical image at a second wavelength λ2. The phosphor screen includes a phosphor layer comprising the phosphor material. A short-pass reflective coating is positioned on a first side of the phosphor layer. The short-pass reflective coating transmits the wavelength λ1 and reflects the wavelength λ2. A long-pass reflective coating is positioned on a second side of the phosphor layer. The long-pass reflective coating transmits the wavelength λ2 and reflects the wavelength λ1. A first substrate is positioned over the short-pass reflective coating. The first substrate is formed of optically clear and thermal conductive material. A second substrate is positioned over the long-pass reflective coating. The second substrate is formed of long-pass absorptive optical filter material that transmits the wavelength λ2 and absorbs wavelength λ1 from ambient light to prevent the phosphor layer from being excited by the ambient light. The phosphor screen may alternatively be used for a direct-view visual display apparatus. These principles can also be utilized for backlighting and general illumination applications.

14 Claims, 7 Drawing Sheets

PHOSPHOR SCREEN AND DISPLAYS SYSTEMS

BACKGROUND OF THE INVENTION

1. Field of the Invention

The present invention is related to a photo-luminescent device for producing visible light upon excitation, or for producing visual images if the excitation light is modulated. More particularly, the present invention relates to the packaging of a photo-luminescent device to improve the effective use of the photo-luminescent material. The present invention also relates generally to visual display systems, and more particularly to visual display systems utilizing photo-luminescent materials in the image screen or in the illumination source of the display.

2. Description of the Related Art

Phosphors, as a type of luminescent material, have been used in the devices such as cathode-ray-tubes, x-ray screens, photo-luminescent displays, and lighting or illumination products such as florescent lamps and phosphor-converted white light-emitting diodes (LEDs). Phosphors can absorb the energy from the excitation source and convert it to visible light or other wavelengths. Photo-luminescent phosphors are the type of phosphors that can convert the radiant energy of the light from the excitation source to a different wavelength. For visual displays, the emission of the phosphors is in the visible range to human eyes, namely, in the 400 nm-750 nm region. The excitation source for these phosphors has a wavelength typically in a band with higher energy, i.e. from UV (180 nm-360 nm) to blue light (360 nm-480 nm) region.

Phosphors, upon absorbing the excitation energy, will generate heat because of the conversion loss. The emitted light from the phosphor radiate isotropically into the space, half forward and half backward about the phosphor plane. Phosphors that can be excited by blue light can also be excited not only by the blue light from the excitation source, but also the blue light in typical natural day light. The self-heating of phosphor, if not managed properly, can heat up the phosphor material, resulting in reduction in emission efficiency, and in extreme cases, thermal quenching of the light emission. Intense heating can also result in physical and chemical degradation of phosphor material, reducing the lifetime of the phosphor and performance of the device. The light emitted from the phosphor but backward toward the excitation source will not be usable if not re-directed toward the forward direction, resulting in loss of half of the light. It is critical in phosphor packaging design to utilize both backward and forward emission from the phosphor for maximal optical efficiency.

Conventional phosphor screens, such as the faceplate of a cathode ray tube (CRT) or the phosphor plate used for x-ray imaging, comprise a thin layer of highly reflective aluminum coating on the phosphor. This aluminum coating allows the electron beam or x-ray to penetrate through to excite the phosphor, but reflects the backward emission from the phosphor toward the forward direction, improving the effective optical efficiency of the phosphor. In addition, the aluminum coating helps dissipate the heat generated in the phosphor layer, because of the high thermal conductivity of aluminum.

For UV excited phosphors, such as phosphors used in the fluorescent lamps, the normal ambient light will not be able to provide excitation sufficient to produce significant phosphor emission. However, blue-excited phosphors, can be excited not only from the light from the excitation source, but also by the typical visible light in ambient. For lighting applications, this does not seem to be a problem. For display applications, the phosphor should be excited only by the controlled light from the excitation source. In image forming screen applications, the phosphor screens using blue excitation light but without consideration of controlling natural ambient light has a low contrast ratio because of the phosphor emission caused by the ambient light. This is not acceptable for high fidelity display systems.

SUMMARY OF THE INVENTION

The optics display apparatus of this invention is analogous to the CRT. In this invention, the UV or visible excitation light source is analogous to the electron gun in the CRT, the light modulating device to the control gate and deflection coils, and the imaging optics to the focusing electrodes. Since UV or blue light sources, such as UV and blue light emitting diodes or lasers, are much more reliable and more efficient than electron guns in the CRT, the optical display system of this invention will be more reliable and consume much less electrical power. This is particularly important in the case of projection displays using CRTs as the image sources. In such display systems, the CRTs are subjected to very high power to both the electron guns and phosphor screens in order to produce needed luminance to the system. The CRTs used in such systems, referred to as "Projection Tubes", typically have very short lifetimes.

The phosphor screen described in this invention is analogous to the phosphor screen in the CRT. Other than the aluminum coating on the phosphor layer of the CRT faceplate, the phosphor screen of this invention uses a reflective short-pass filter, which transmits the wavelength of the excitation light in UV or blue region and reflects the light emitted from the phosphor. Other than tinted glass of the CRT faceplate, this invention uses a reflective-absorption filter glass, which reflects the excitation light leaking through the phosphor layer back into the phosphor layer, increasing the effective optical path of the excitation light in the phosphor layer, thus increasing the absorption coefficient of the phosphor. This reflective coating is deposited onto an absorptive glass substrate, which absorbs the wavelength of the excitation light. Such an absorptive filter will prevent the excitation light from leaking out to interfere with the emission spectrum of the phosphor, and prevent the uncontrolled ambient light at the same wavelength as the excitation light from exciting the phosphor, improving the contrast ratio of the display. To dissipate the heat generated by the phosphor during operation, the phosphor material is deposited on to thermally conductive substrates so the heat can be conducted away from the phosphor, reducing the thermal load on the phosphor. This will improve the phosphor optical performance and the lifetime of the phosphor.

The display apparatus of this invention can be used as a direct-viewed display, or as an image source of a display system, in which the source image is optically magnified and relayed or focused on to another image plane, such as in projection displays systems, head-up-display systems, or head-mounted-displays.

The phosphor screen described in this invention can also be used as non-image forming applications. In visual display systems using liquid crystal displays (LCDs), this phosphor screen, in combination with a UV or blue light source, can be used to produce a backlight to illuminate the display. The backlight utilizing the phosphor screen can provide efficient, stable, and tunable spectra with combination of phosphors with different emissions.

For backlight applications, the phosphor screen can have alternate configurations, depending on the scheme of the illumination of the excitation light, and the type of displays, i.e. reflective, transflective, or transmissive.

The phosphor screen construction described in this invention is applicable to general lighting designs using blue LED and phosphors, as they are used in the display backlight designs.

In summary, this invention describes display apparatus, display systems, and a display backlight incorporating a phosphor screen that is constructed with materials to improve phosphor's thermal and optical performance, and the quality of the display.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
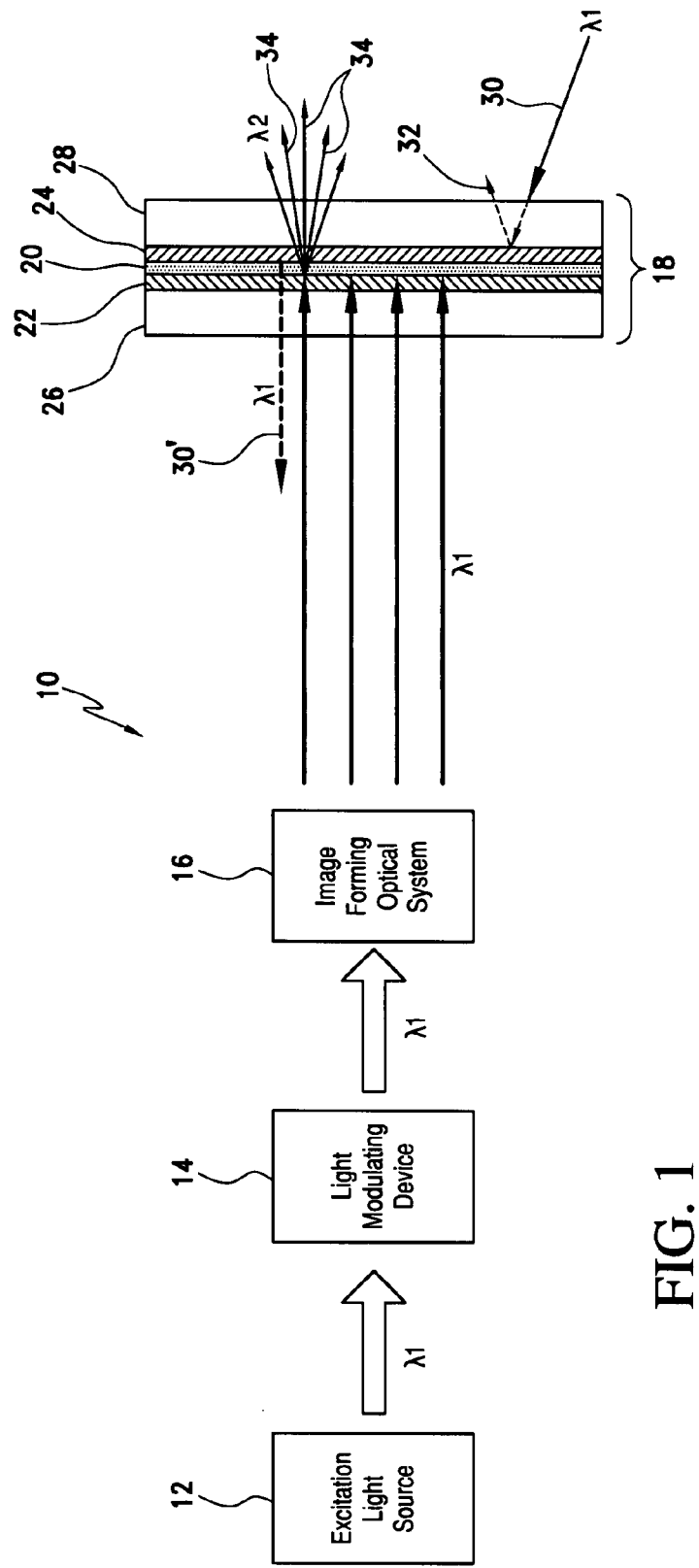
FIG. 1 is a schematic illustration of a first embodiment of the present invention in which a visual display system using a phosphor screen of the present invention as an image forming surface.

Referring now to the drawings and the characters of reference marked thereon, FIG. 1 illustrates a visual display system, designated generally as 10, in accordance with the principles of the present invention. In this embodiment, as will be discussed below in detail, a phosphor screen is utilized as an image forming surface.

An excitation light source 12 provides light in a first wavelength $\lambda 1$. The excitation light source 12 may be ultraviolet or blue light at wavelength $\lambda 1$.

A light modulating device 14 receives light from the excitation light source and modulates the light to form an image. The light modulating device 14 may be, for example, a transmissive liquid crystal display, a reflective liquid crystal display, a micro-mirror array, or a spatial light modulator.

An imaging forming optical system 16 receives the outputted light from the light modulating device and magnifies and relays the image. The optical system 16 transfers the image formed by or at the light modulating device and forms a second image at the plane where the phosphor material is placed. Such image forming optical systems may consist of, for example, plural refractive or reflective, or diffractive optical elements, or combination of different types of optical elements, by which the image formed at or by device 14 is transferred to the phosphor plane with minimal distortion, aberration, and degradation of the image quality of the original information to be displayed.

A phosphor screen 18, comprising phosphor material is excitable by light in the first wavelength $\lambda 1$. The phosphor screen 18 receives the optical image from the image forming optical system 16 and produces the optical image at a second wavelength $\lambda 2$. The phosphor screen 18 includes a phosphor layer 20 having phosphor material emitting the second wavelength $\lambda 2$. A short-pass reflective coating 22 is positioned on a first side of the phosphor layer 20. The short-pass reflective coating 22 transmits the wavelength $\lambda 1$ and reflects the wavelength $\lambda 2$. A long-pass reflective coating 24 is positioned on a second side of the phosphor layer 20. The long-pass reflective coating 24 transmits the wavelength $\lambda 2$ and reflects the wavelength $\lambda 1$. A first substrate 26 is positioned over the short-pass reflective coating 22. The first substrate 26 is formed of optically clear and thermally conductive material for transmitting the wavelength $\lambda 1$ and dissipating heat generated by the phosphor layer 20 during operation. A second substrate 28 is positioned over the long-pass reflective coating 24. The second substrate is formed of long-pass absorptive optical filter material that transmits the second wavelength $\lambda 2$ and absorbs the wavelength $\lambda 1$ from the ambient light 30 for improving display contrast ratio in bright ambient conditions.

Light at wavelength $\lambda 1$ that is reflected back toward the phosphor layer 20 by long-pass reflective coating 24 is designated 30'. Residual ambient light at wavelength $\lambda 1$ after absorption by second substrate 28 is designated as 32. The image light emission at wavelength $\lambda 2$ is designated as 34.

The phosphor layer 20 includes phosphor particles with an average granular size in a range from about 1.0 nm to 10 μm, deposited at a thickness in a range from about 0.01 mm to 0.50 mm. Preferably, the phosphor particles have an average granular size in a range from 1.5 nm to 5.0 μm, deposited at a thickness in a range from 0.05 mm to 0.25 mm.

The phosphor material may be a chemical composition of alkaline earth or rare-earth metal salts of aluminate, silicate, oxynitride, nitride, chalcogenides of cadmium or zinc, or combinations of the same that are excitable by light at the first wavelength $\lambda 1$ in a range of from 360 nm to 480 nm.

The phosphor material is preferably a chemical composition of cadmium chalcogenide and zinc chalcogenide, with the cadmium chalcogenide forming the core of the phosphor particle and zinc chalcogenide forming a shell covering the cadmium chalcogenide core. The core-shell phosphor particle preferably has a particle size in the range of 1.0 nm to 3.0 nm, that emits light at the second wavelength $\lambda 2$ in the visible wavelength range, from 500 nm to 600 nm, when excited by the first wavelength $\lambda 1$ at a wavelength range of from 360 nm to 480 nm.

The phosphor layer may comprise a single phosphor for emission of a single color at dominant wavelength $\lambda 2$, or a mixture of multiple phosphors for emission of multi-color spectrum or white light. It may emit light at the second wavelength $\lambda 2$ in the visible wavelength range, from 400 nm to 650 nm.

The first substrate is formed of optically clear and thermal conductive material having a thermal conductivity in a range of 0.7 watt/(K·m) to 30 watt/(K·m), preferably in a range of 1.0 watt/(K·m) to 20 watt/(K·m). This may include, for example, conventional optical glasses, quartz, sapphire, and conventional optical ceramics. A preferred material is sapphire or sapphire-like optical ceramic material.

The excitation light source 12 may be a solid state device having at least one light emitting diode (LED) for emitting light of the first wavelength in a range of from 360 nm to 480 nm. It may comprise an optical element (e.g. conventional reflector surrounding the LED or condenser lens positioned in front of the LED, or a combination thereof) that collects and directs the light from an LED device wavelength toward said phosphor layer. The excitation light source 12 may comprise an optical element that distributes the light emission from an LED device uniformly over the phosphor layer (e.g. diffuser or microlens array).

Alternatively, the excitation light source 12 may be a solid state device having single or multiple laser sources in a form of an array, emitting light of the first wavelength from 360 nm to 480 nm. It may comprise an optical element that collimates and combines multiple laser beams and directs the light at the second wavelength. The excitation light source 12 may comprise an optical element that distributes the light emission from a laser source uniformly over the phosphor layer.

Figure 2:
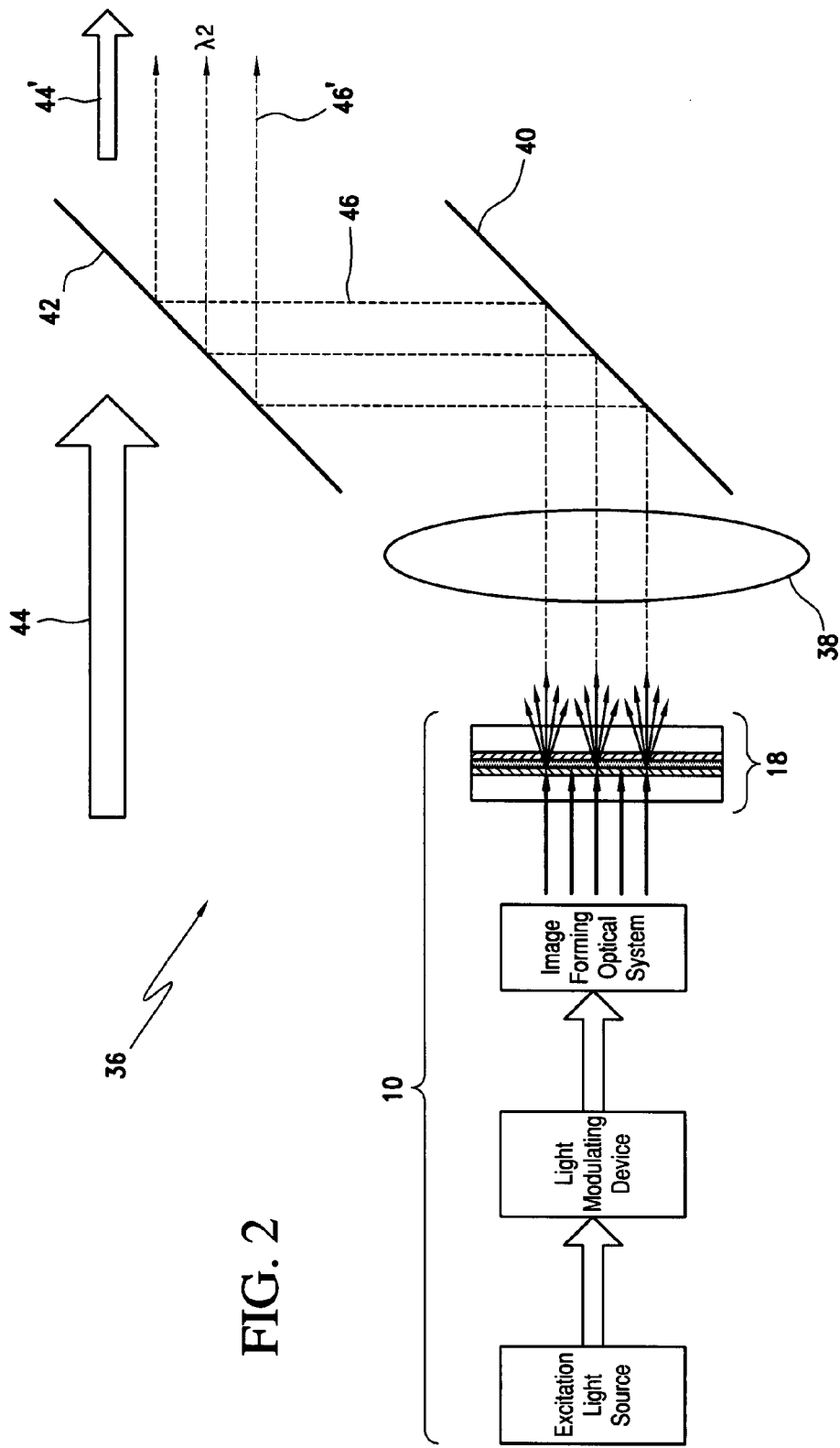
FIG. 2 is a schematic illustration of a Heads-Up-Display (HUD) system utilizing the visual display system of the present invention.

Referring now to FIG. 2, utilization of the visual display system for a Heads-Up-Display (HUD) system is illustrated, designated generally as 36. This HUD 36 uses the phosphor screen as the image source. The HUD system 36 utilizes a relay optics system 38 for receiving the optical image at the second wavelength $\lambda 2$ from the visual display apparatus 10 and forming a relayed image at an observer's eye. A mirror 40 is positioned to receive the relayed image from the relay optics system 38 and change the direction of light thereof. A see-through imaging combiner 42 combines real scenery (i.e. light from the forward scene) 44 and the relayed image 46 from the relay optics 38, to provide the combined image 44', 46'. The relay optics system 38 may be of the type generally used for HUDs such as these used on the aircraft or automobiles for navigation and information displays. The mirror 40 is generally a folding mirror typically used in HUDs. The imaging combiner 42 may be made from optically clear materials with beam-splitting coatings, or prismatic structures using total internal reflections.

Figure 3:
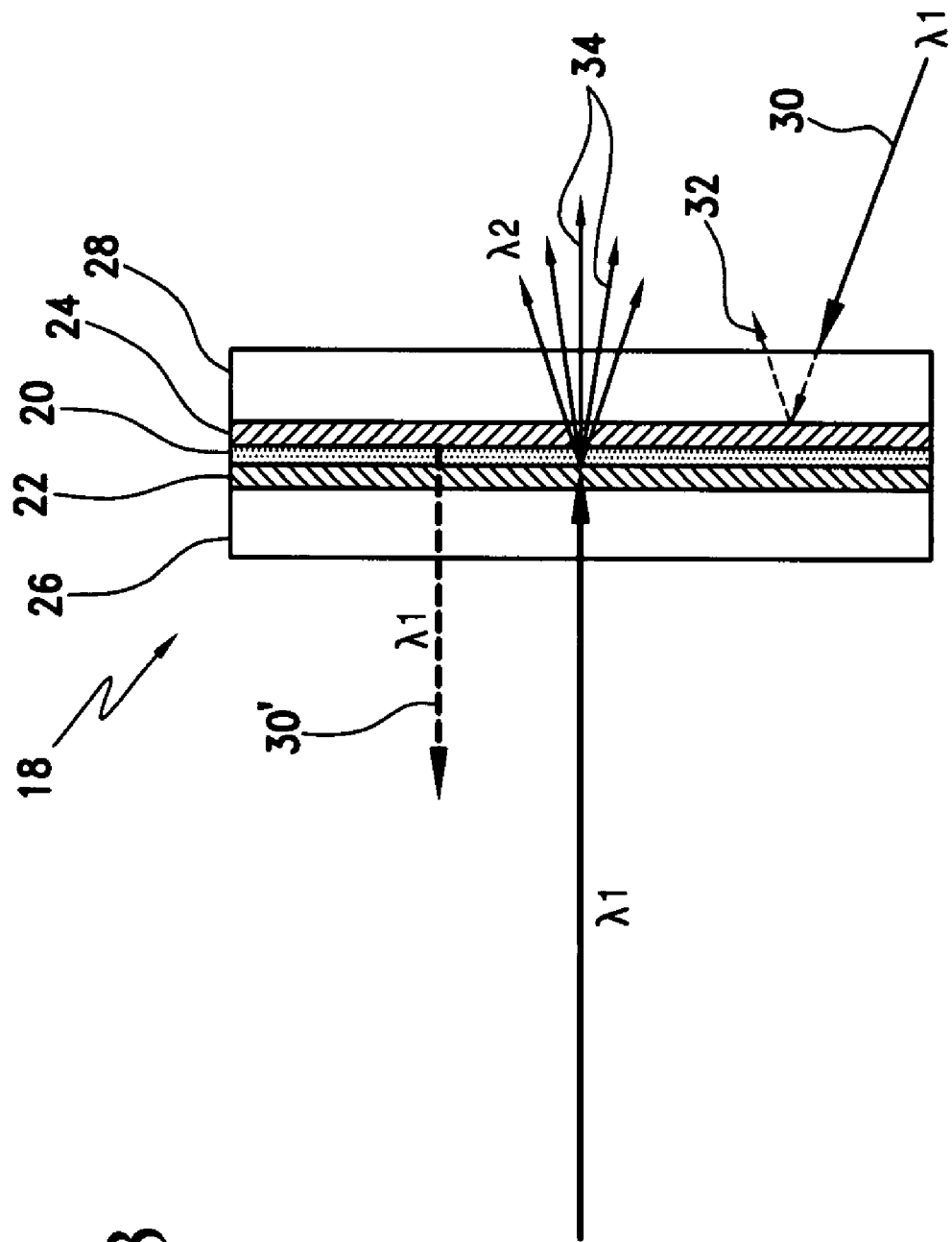
FIG. 3 shows the phosphor screen of the present invention as implemented for image forming.

Referring now to FIG. 3, an enlarged view of the phosphor screen 18 as implemented for image forming, is illustrated. In this instance, the phosphor screen designated as 18 comprises a phosphor layer 20 excitable by light in a wavelength $\lambda 1$, a short-pass reflective coating 22; and, a long-pass reflective coating 24. A first substrate 26 is positioned over the short-pass reflective coating being formed of optically clear and thermal conductive material for transmitting the wavelength $\lambda 1$ and dissipating heat generated by the phosphor layer 20 during operation. A second substrate 28 is positioned over the long-pass reflective coating 24 and is formed of long-pass filter material for transmitting the wavelength $\lambda 2$ produced by the phosphor layer 20, but absorbing the light at wavelength $\lambda 1$. The phosphor screen 18 produces light emission 34 at the second wavelength $\lambda 2$. Light at wavelength $\lambda 1$ is reflected back by the long-pass reflective coating 24, as indicated by numeral designation 30', which is absorbed by the phosphor layer 20 for the second time. This double pass effectively increases the absorption efficiency of the phosphor, thus improves the light output produced by the phosphor. The ambient light 30 in a wavelength $\lambda 1$ will be absorbed by the second substrate 28, and reflected by the long-pass reflective coating 24 so it will not excite the phosphor layer 20 to produce any significant emission. Therefore, the phosphor layer 20 is only excited by the modulated light in a wavelength $\lambda 1$ from the image forming optical system 16.

Figure 4:
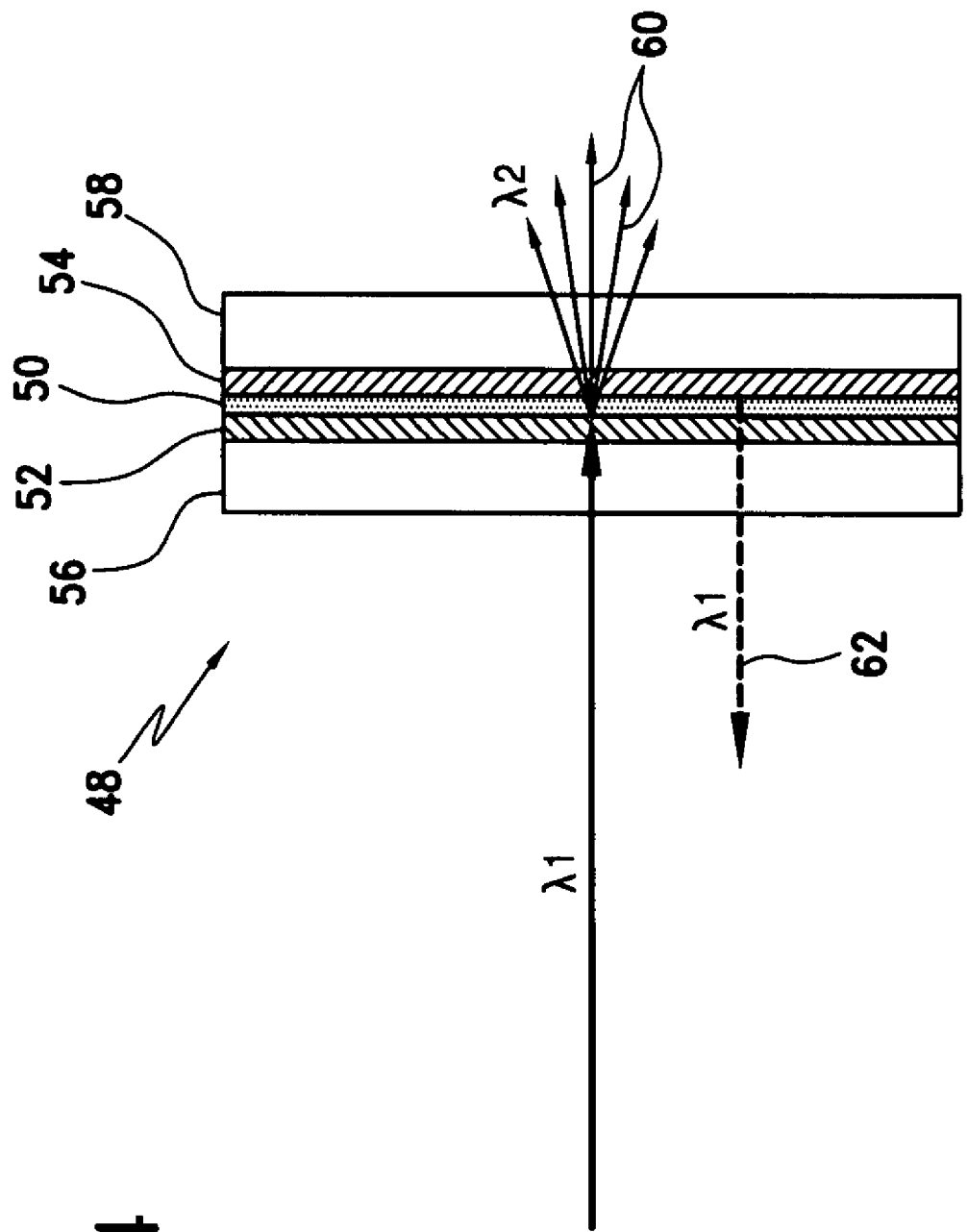
FIG. 4 shows a second embodiment the phosphor screen of the present invention as implemented for backlighting.

Referring now to FIG. 4, a second embodiment of the phosphor screen of the present invention is illustrated, designated generally as 48, as implemented for backlighting. In this instance, the phosphor screen 48 includes a phosphor layer 50 excitable by light in a wavelength $\lambda 1$; a short-pass reflective coating 52; and, a long-pass reflective coating 54. A first substrate 56 is positioned over the short-pass reflective coating being formed of optically clear and thermal conductive material for transmitting the wavelength $\lambda 1$ and dissipating heat generated by the phosphor layer 50 during high intensity operation. A second substrate 58 is positioned over the long-pass reflective coating 54 and is formed of optically clear material for transmitting the wavelength $\lambda 2$ of visible range from 400 nm to 650 nm for enhanced efficiency and thermal performance. The phosphor screen 48 produces light emission 60 at the second wavelength $\lambda 2$. Light at wavelength $\lambda 1$ is reflected back by the long-pass reflective coating 54, as indicated by numeral designation 62, which is absorbed by the phosphor layer 50 for the second time. This double pass effectively increases the absorption efficiency of the phosphor, thus improves the light output produced by the phosphor.

Figure 5:
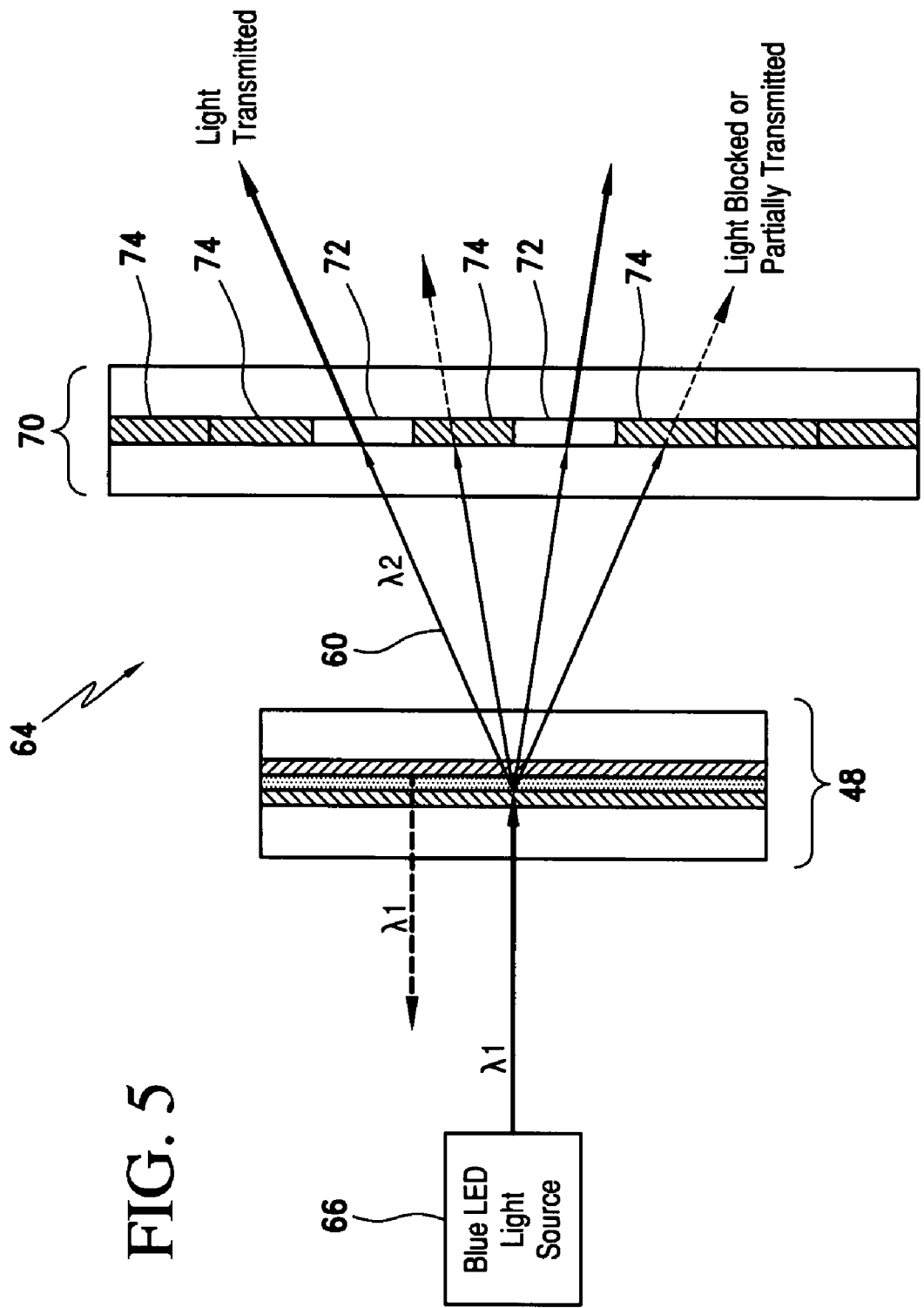
FIG. 5 shows a second embodiment of the visual display system as implemented as a direct-view visual display apparatus.

Referring now to FIG. 5, implementation of the FIG. 4 phosphor screen 48 is illustrated in a direct-view visual display apparatus, designated generally as 64. In this embodiment, a blue light emitting diode (LED) light source 66 provides light in a first wavelength $\lambda 1$ in a wavelength range from 360 nm to 480 nm within the blue light spectrum. The phosphor screen 48 produces light emission at a second wavelength $\lambda 2$ from 400 nm to 650 nm. A liquid crystal display (LCD) 70 modulates the emission from the phosphor screen and forms an image containing the information of interest that is viewed directly at the surface of the LCD. Light at wavelength $\lambda 2$ is reflected back by long-pass reflective coating 54. The liquid crystal display's ON pixel elements are designated 72. The liquid crystal display's OFF pixel elements are designated 74.

Figure 6:
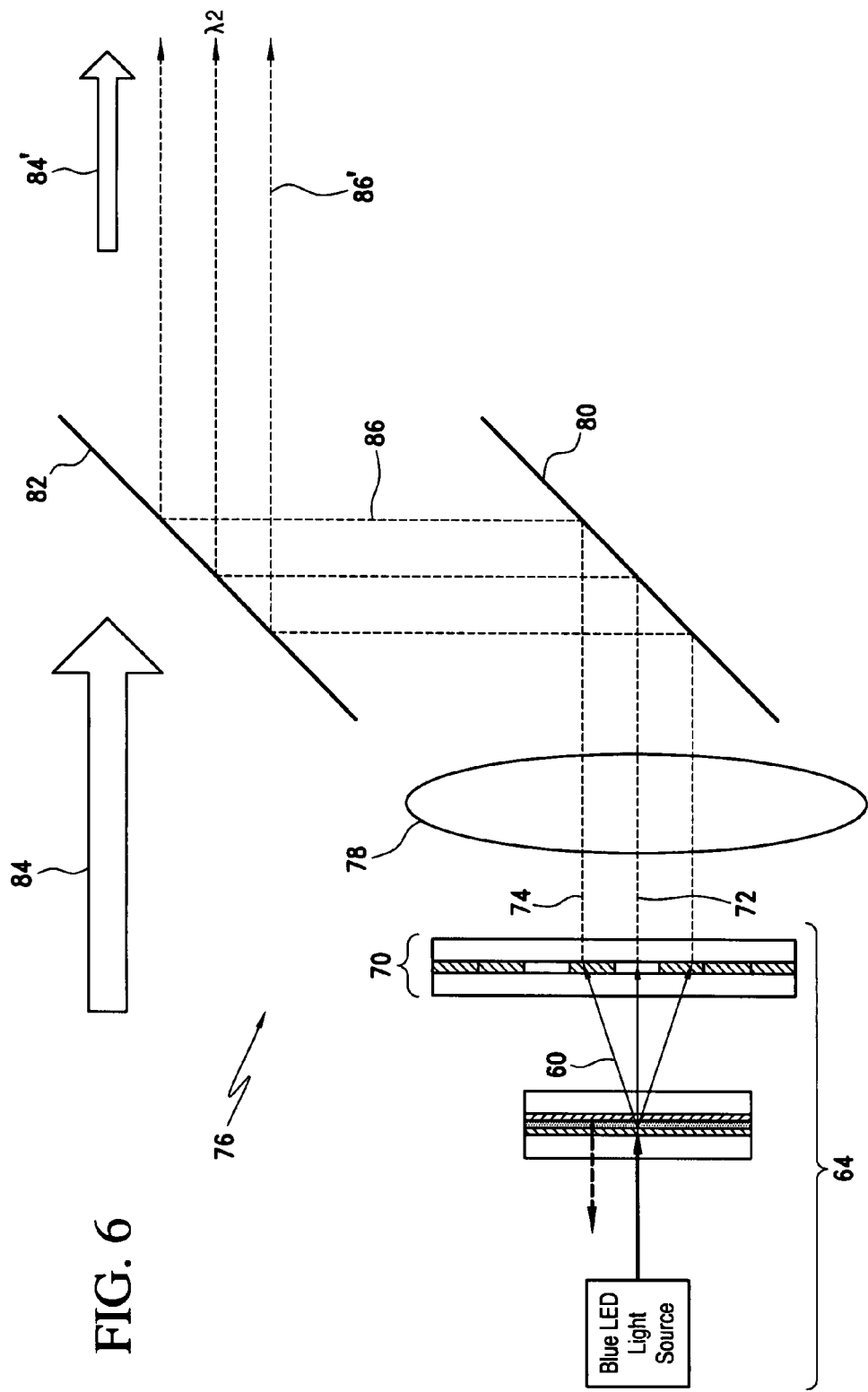
FIG. 6 shows another embodiment of a Heads-Up-Display (HUD) system utilizing the direct view visual display apparatus of FIG. 5.

Referring now to FIG. 6, utilization of the direct-view visual display system of the FIG. 5 embodiment for a Heads-Up-Display (HUD) system is illustrated, designated generally as 76. This HUD 76 uses the phosphor screen as the image source. The HUD system 76 utilizes a relay optics system 78 for receiving the optical image at the second wavelength $\lambda 2$ from the visual display apparatus 64 and forming a relayed image at an observer's eye. A mirror 80 is positioned to receive the relayed image from the relay optics system 78 and change the direction of light thereof. A see-through imaging combiner 82 combines real scenery (i.e. light from the forward scene) 84 and the relayed image 86 from the relay optics 38, to provide the combined image 84', 86'. The relay optics system 78 may be of the type generally used for HUDs consisting of, for example, plural refractive or reflective, or diffractive optical elements, or combination of different types of optical elements, by which the image formed at device 70 is projected at a designated focal distance from a few feet to infinity, so it is combined with the forward scenery 84. The mirror 40 is generally a folding mirror typically used in HUDs.

Figure 7:
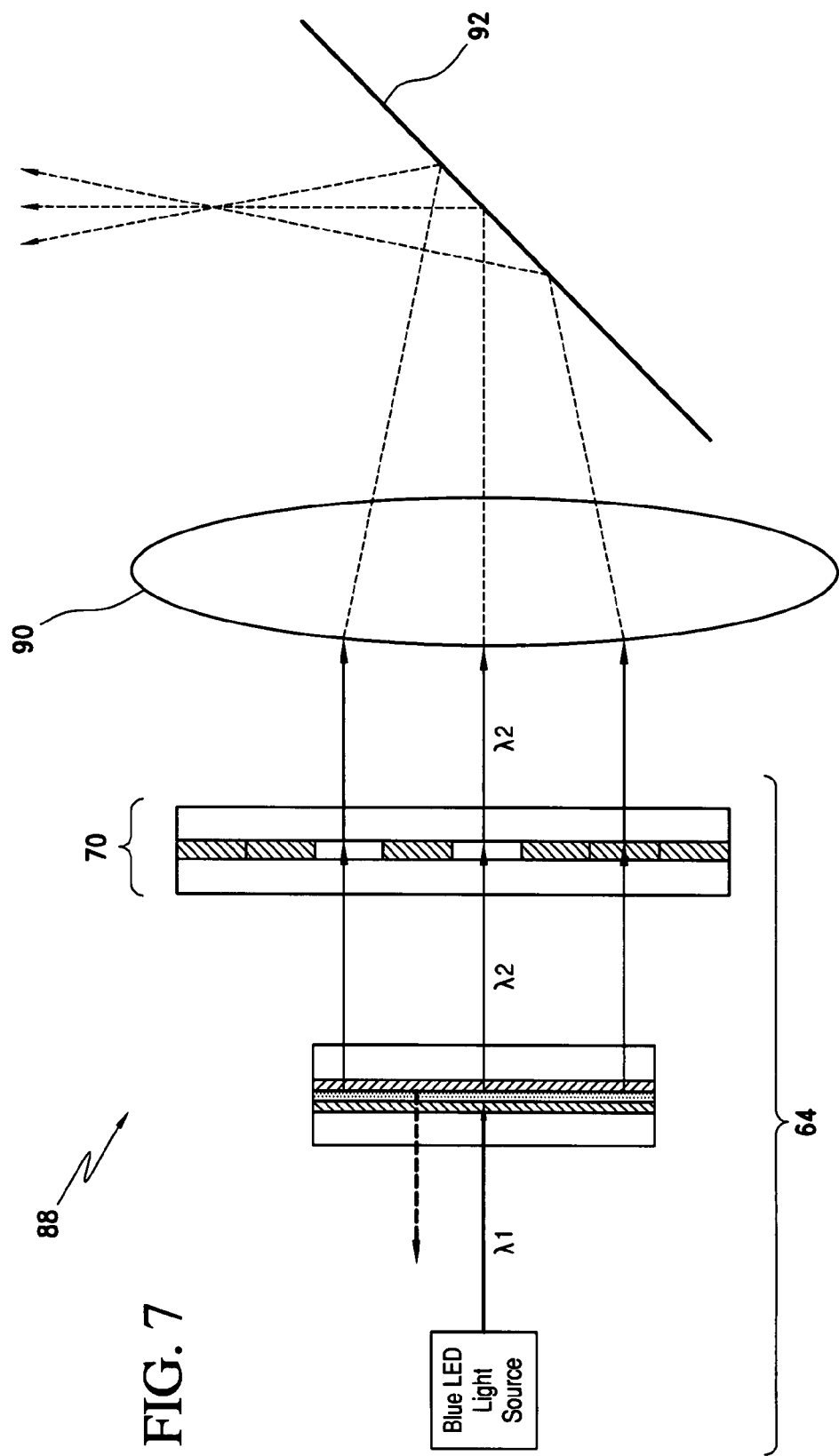
FIG. 7 is a schematic illustration of a Helmet-Mounted-Display (HMD) system using the direct view visual display apparatus of FIG. 5.

Referring now to FIG. 7, utilization of the direct-view visual display system of the FIG. 5 embodiment for a Helmet-Mounted-Display (HMD) system is illustrated, designated generally as 88. This HMD 88 uses the phosphor screen as the image source. As in the last embodiment, the HMD system 88 utilizes an appropriate relay optics system 90 for receiving the optical image at the second wavelength $\lambda 2$ from the visual display apparatus 64 and forming a relayed image at an observer's eye. A see-through imaging combiner 82 combines real scenery (i.e. light from the forward scene) 98 and the relayed image from the relay optics 90, to provide the combined image. The relay optics system 90 may be of the type generally used for HMDs and may consist of, for example, plural refractive or reflective, or diffractive optical elements, or combination of different types of optical elements, by which the image formed at device 70 is projected at a designated focal distance from a few feet to infinity, so it is combined with the forward scenery. The imaging combiner 92 includes a visor of the helmet or head-worn optical element before the observer's eye, made from materials optically clear in the visible wavelength range from 400 nm to 650 nm; and a reflective beam splitting coating deposited on the visor or an optical element before observer's eye, reflecting the light at the second wavelength $\lambda 2$ and transmitting light from ambient.

Other embodiments and configurations may be devised without departing from the spirit of the invention and the scope of the appended claims. For instance, the embodiment illustrated by FIG. 4 can also be used for general lighting apparatus. Such a phosphor screen 48 can be placed remotely from the excitation light source, providing additional design flexibility and improved phosphor efficiency.

Plural small phosphor screens may be arranged in an array to form a large phosphor screen, or to form a larger array with specific color arrangement. Phosphor screens with different phosphors emitting at different wavelength may be arranged in a cascaded configuration to form multi-color screen.

The invention claimed is:

1. A visual display apparatus, comprising:
   a) an excitation light source for providing light in a first wavelength $\lambda 1$;
   b) a light modulating device for receiving light from said excitation light source and modulating said light to form an image;
   c) an imaging forming optical system for receiving outputted light from said light modulating device and magnifying and relaying said image; and,
   d) a phosphor screen, comprising phosphor material being excitable by light in said first wavelength $\lambda 1$, said phosphor screen for receiving said optical image from said image forming optical system and producing said optical image at a second wavelength $\lambda 2$, said phosphor screen, comprising:
      i. a phosphor layer comprising said phosphor material emitting said second wavelength $\lambda 2$;
      ii. a short-pass reflective coating positioned on a first side of said phosphor layer, said short-pass reflective coating for transmitting said wavelength $\lambda 1$ and reflecting said wavelength $\lambda 2$;
      iii. a long-pass reflective coating positioned on a second side of said phosphor layer, said long-pass reflective coating for transmitting said wavelength $\lambda 2$ and reflecting said wavelength $\lambda 1$;
      iv. a first substrate positioned over said short-pass reflective coating, said first substrate being formed of optically clear and thermal conductive material for transmitting said wavelength $\lambda 1$ and dissipating heat generated by said phosphor layer during high intensity operation; and,
      v. a second substrate positioned over said long-pass reflective coating, said second substrate being formed of long-pass absorptive optical filter material that transmits said second wavelength $\lambda 2$ and absorbs said wavelength $\lambda 1$ from the ambient light for improving display contrast ratio in bright ambient conditions,
      wherein said first substrate comprises optically clear and thermal conductive material having a thermal conductivity in a range of 0.7 watt/(K·m) to 30 watt/(K·m).

2. The visual display apparatus of claim 1, wherein said phosphor layer comprises phosphor particles with an average granular size in a range from 1.0 nm to 10 μm, deposited at a thickness in a range from 0.01 mm to 0.50 mm.

3. The visual display apparatus of claim 1, wherein said phosphor layer comprises phosphor particles with an average granular size in a range from 1.5 nm to 5.0 μm, deposited at a thickness in a range from 0.05 mm to 0.25 mm.

4. The visual display apparatus of claim 1, wherein said phosphor material is a chemical composition of alkaline earth or rare-earth metal salts of aluminate, silicate, oxynitride, nitride, chalcogenides of cadmium or zinc, or combinations of the same, that are excitable by light at said first wavelength $\lambda 1$ in a range of from 360 nm to 480 nm.

5. A visual display apparatus, comprising:
   a) an excitation light source for providing light in a first wavelength $\lambda 1$;
   b) a light modulating device for receiving light from said excitation light source and modulating said light to form an image;
   c) an imaging forming optical system for receiving outputted light from said light modulating device and magnifying and relaying said image; and,
   d) a phosphor screen, comprising phosphor material being excitable by light in said first wavelength $\lambda 1$, said phosphor screen for receiving said optical image from said image forming optical system and producing said optical image at a second wavelength $\lambda 2$, said phosphor screen, comprising:
      i. a phosphor layer comprising said phosphor material emitting said second wavelength $\lambda 2$;
      ii. a short-pass reflective coating positioned on a first side of said phosphor layer, said short-pass reflective coating for transmitting said wavelength $\lambda 1$ and reflecting said wavelength $\lambda 2$;
      iii. a long-pass reflective coating positioned on a second side of said phosphor layer, said long-pass reflective coating for transmitting said wavelength $\lambda 2$ and reflecting said wavelength $\lambda 1$;
      iv. a first substrate positioned over said short-pass reflective coating, said first substrate being formed of optically clear and thermal conductive material for transmitting said wavelength $\lambda 1$ and dissipating heat generated by said phosphor layer during high intensity operation; and,
      v. a second substrate positioned over said long-pass reflective coating, said second substrate being formed of long-pass absorptive optical filter material that transmits said second wavelength $\lambda 2$ and absorbs said wavelength $\lambda 1$ from the ambient light for improving display contrast ratio in bright ambient conditions,
      wherein said phosphor material comprises a chemical composition of cadmium chalcogenide and zinc chalcogenide, with said cadmium chalcogenide forming the core of the phosphor particle and zinc chalcogenide forming a shell covering the cadmium chalcogenide core, said core-shell phosphor particle having a particle size in the range of 1.0 nm to 3.0 nm, that emits light at said second wavelength $\lambda 2$ in the visible wavelength range, from 500 nm to 600 nm, when excited by said first wavelength $\lambda 1$ at a wavelength range of from 360 nm to 480 nm.

6. The visual display apparatus of claim 1, wherein said phosphor layer comprises a single phosphor for emission of a single color at dominant wavelength $\lambda 2$, or a mixture of multiple phosphors for emission of multi-color spectrum or white light.

7. The visual display apparatus of claim 1, wherein said phosphor material comprises a chemical composition that emits light at said second wavelength $\lambda 2$ in the visible wavelength range, from 400 nm to 650 nm.

8. The visual display apparatus of claim 1, wherein said first substrate comprises optically clear and thermal conductive material having a thermal conductivity in a range of 1.0 watt/(K·m) to 20 watt/(K·m).

9. The visual display apparatus of claim 1, wherein said light modulating device comprises: a transmissive liquid crystal display, a reflective liquid crystal display, a micromirror array, or a spatial light modulator.

10. The visual display apparatus of claim 1, wherein said excitation light source comprises a solid state device consisting of:
   a) at least one light emitting diode (LED) for emitting light of said first wavelength in a range of from 360 nm to 480 nm;
   b) an optical element that collects and directs the light from an LED device wavelength toward said phosphor layer; and,
   c) an optical element that distributes the light emission from an LED device uniformly over the phosphor layer.

11. A visual display apparatus of claim 1, wherein said excitation light source comprises a solid state device selected from the group consisting of:
   a) single or multiple laser sources in a form of an array, emitting light of said first wavelength from 360 nm to 480 nm;
   b) an optical element that collimates and combines multiple laser beams and directs the light at said second wavelength; and,
   c) an optical element that distributes the light emission from a laser source uniformly over the phosphor layer.

12. A phosphor screen for image forming, comprising phosphor material being excitable by light in a wavelength $\lambda 1$, said phosphor screen for receiving an optical image from an image forming optical system and producing said optical image at a wavelength $\lambda 2$, said phosphor screen, comprising:
   a) a phosphor layer comprising said phosphor material;
   b) a short-pass reflective coating positioned on a first side of said phosphor layer, said short-pass reflective coating for transmitting said wavelength $\lambda 1$ and reflecting said wavelength $\lambda 2$;
   c) a long-pass reflective coating positioned on a second side of said phosphor layer, said long-pass reflective coating for transmitting said wavelength $\lambda 2$ and reflecting said wavelength $\lambda 1$;
   d) a first substrate positioned over said short-pass reflective coating, said first substrate being formed of optically clear and thermal conductive material; and,
   e) a second substrate positioned over said long-pass reflective coating, said second substrate being formed of long-pass absorptive optical filter material that transmits said wavelength $\lambda 2$ and absorbs wavelength $\lambda 1$ from ambient light to prevent said phosphor layer from being excited by the ambient light,
      wherein said first substrate comprises optically clear and thermal conductive material having a thermal conductivity in a range of 0.7 watt/(K·m) to 30 watt/(K·m).

13. A Heads-Up-Display (HUD) system, comprising:
   a) visual display apparatus, comprising:
      i. an excitation light source for providing light in a first wavelength $\lambda 1$;
      ii. a light modulating device for receiving light from said excitation light source and modulating said light to form an image;
      iii. an imaging forming optical system for receiving outputted light from said light modulating device and magnifying and relaying said image; and,
      iv. a phosphor screen, comprising phosphor material being excitable by light in said first wavelength $\lambda 1$, said phosphor screen for receiving said optical image from said image forming optical system and producing said optical image at a second wavelength ($\lambda 2$), said phosphor screen, comprising:
         1. a phosphor layer comprising said phosphor material emitting said second wavelength $\lambda 2$;
         2. a short-pass reflective coating positioned on a first side of said phosphor layer, said short-pass reflective coating for transmitting said wavelength $\lambda 1$ and reflecting said wavelength $\lambda 2$;
         3. a long-pass reflective coating positioned on a second side of said phosphor layer, said long-pass reflective coating for transmitting said wavelength $\lambda 2$ and reflecting said wavelength $\lambda 1$;
         4. a first substrate positioned over said short-pass reflective coating, said first substrate being formed of optically clear and thermal conductive material for transmitting said wavelength $\lambda 1$ and dissipating heat generated by said phosphor layer during high intensity operation; and,
         5. a second substrate positioned over said long-pass reflective coating, said second substrate being formed of long-pass absorptive optical filter material that transmits said second wavelength $\lambda 2$ and absorbs wavelength $\lambda 1$ said wavelength $\lambda 1$ from the ambient light for improving display contrast ratio in bright ambient conditions;
   b) a relay optics system for receiving said optical image at said second wavelength $\lambda 2$ from said visual display apparatus and forming a relayed image at an observer's eye;
   c) a mirror positioned to receive said relayed image from said relay optics system and changing the direction of light thereof; and,
   d) a see-through imaging combiner that combines real scenery and said relayed image from said relay optics.

14. A phosphor screen for image forming, comprising phosphor material being excitable by light in a wavelength $\lambda 1$, said phosphor screen for receiving an optical image from an image forming optical system and producing said optical image at a wavelength $\lambda 2$, said phosphor screen, comprising:
   a) a phosphor layer comprising said phosphor material;
   b) a short-pass reflective coating positioned on a first side of said phosphor layer, said short-pass reflective coating for transmitting said wavelength $\lambda 1$ and reflecting said wavelength $\lambda 2$;
   c) a long-pass reflective coating positioned on a second side of said phosphor layer, said long-pass reflective coating for transmitting said wavelength $\lambda 2$ and reflecting said wavelength $\lambda 1$;
   d) a first substrate positioned over said short-pass reflective coating, said first substrate being formed of optically clear and thermal conductive material; and,
   e) a second substrate positioned over said long-pass reflective coating, said second substrate being formed of long-pass absorptive optical filter material that transmits said wavelength $\lambda 2$ and absorbs wavelength $\lambda 1$ from ambient light to prevent said phosphor layer from being excited by the ambient light, wherein said phosphor material comprises a chemical composition of cadmium chalcogenide and zinc chalcogenide, with said cadmium chalcogenide forming the core of the phosphor particle and zinc chalcogenide forming a shell covering the cadmium chalcogenide core, said core-shell phosphor particle having a particle size in the range of 1.0 nm to 3.0 nm, that emits light at said second wavelength $\lambda 2$ in the visible wavelength range, from 500 nm to 600 nm, when excited by said first wavelength $\lambda 1$ at a wavelength range of from 360 nm to 480 nm.

* * * * *